US012384313B1

(12) United States Patent
McCain

(10) Patent No.: US 12,384,313 B1
(45) Date of Patent: Aug. 12, 2025

(54) ATTENUATOR MOUNTING SYSTEM AND METHOD OF USE

(71) Applicant: J Travis McCain, Aledo, TX (US)

(72) Inventor: J Travis McCain, Aledo, TX (US)

(*) Notice: Subject to any disclaimer, the term of this patent is extended or adjusted under 35 U.S.C. 154(b) by 370 days.

(21) Appl. No.: 18/088,278

(22) Filed: Dec. 23, 2022

Related U.S. Application Data

(60) Provisional application No. 63/346,076, filed on May 26, 2022.

(51) Int. Cl.
*B60R 19/34* (2006.01)
*B60R 19/38* (2006.01)
*B60R 19/56* (2006.01)
*B60R 19/00* (2006.01)

(52) U.S. Cl.
CPC ........ *B60R 19/34* (2013.01); *B60R 2019/005* (2013.01); *B60R 19/38* (2013.01); *B60R 19/56* (2013.01)

(58) Field of Classification Search
CPC ... B60R 2019/005; B60R 19/56; B60R 19/34; B60R 19/38; B60R 19/40
USPC .......................... 293/119, 131–133; 188/377
See application file for complete search history.

(56) References Cited

U.S. PATENT DOCUMENTS

| | | | | |
|---|---|---|---|---|
| 7,243,964 B1* | 7/2007 | Gertz | ...................... | B60R 19/00 293/133 |
| 9,156,320 B2 | 10/2015 | Maus | | |
| RE46,861 E | 5/2018 | Laturner | | |
| 11,400,884 B1* | 8/2022 | Maus | ...................... | B60R 19/00 |
| 2006/0119116 A1* | 6/2006 | Goertz | .................... | B60R 19/56 293/132 |
| 2009/0174200 A1* | 7/2009 | LaTurner | ................ | B60R 19/34 293/133 |
| 2018/0244227 A1* | 8/2018 | Miller | ..................... | B60R 19/56 |
| 2021/0269995 A1* | 9/2021 | Roy | ..................... | E01F 15/148 |
| 2021/0339695 A1* | 11/2021 | Maus | ..................... | B60R 19/38 |
| 2023/0092342 A1* | 3/2023 | Groeneweg | .......... | B62D 33/023 180/41 |

* cited by examiner

*Primary Examiner* — Gregory A Blankenship
(74) *Attorney, Agent, or Firm* — Richard Eldredge; Leavitt Eldredge Law Firm

(57) ABSTRACT

An attenuator mounting system attaches a mounting plate to the frame of a fire truck or another type of first responder vehicle through channels and other framework so that a truck mounted attenuator (TMA) can be used by the vehicle to prevent impact damage or lessen it. The channels attach to the frame and extend out past the end of the vehicle so that the TMA does not interfere with other equipment on the vehicle and still provides the support necessary to allow the TMA to function.

2 Claims, 3 Drawing Sheets

ATTENUATOR MOUNTING SYSTEM AND METHOD OF USE

BACKGROUND

1. Field of the Invention

The present invention relates generally to safety systems and methods, and more specifically, to an attenuator mounting system that enables a truck mounted attenuator to a fire engine to prevent damage to the fire engine should it be struck by an oncoming vehicle.

2. Description of Related Art

Safety systems are well known in the art and are effective means to prevent or minimize damage or harm to people or property. Common safety systems include impact reduction systems that divert energy from one vehicle that strikes another, such as in car accidents. For example, emergency response vehicles are commonly parked on the side of the road or across lanes of traffic to close those lanes. These places have a high risk to be struck by another vehicle.

Attenuators exist that attach to the back end of most vehicles and when struck by another vehicle absorbs the force of the impact. As the force dissipates harmlessly damage is prevented to the vehicle that has the attenuator attached to it. When an attenuator is attached to a truck they are referred to as truck mounted attenuators (TMA) and allow the attenuator to be used where the vehicle is stationed.

One of the problems associated with common systems is their limited use. For example, attenuators are not configured to attach to fire engines. Fire engines are commonly parked in high-risk areas and to not have an attenuator attached leaves the vehicles and it's first responders at risk of secondary collisions.

Accordingly, although great strides have been made in the area of safety systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
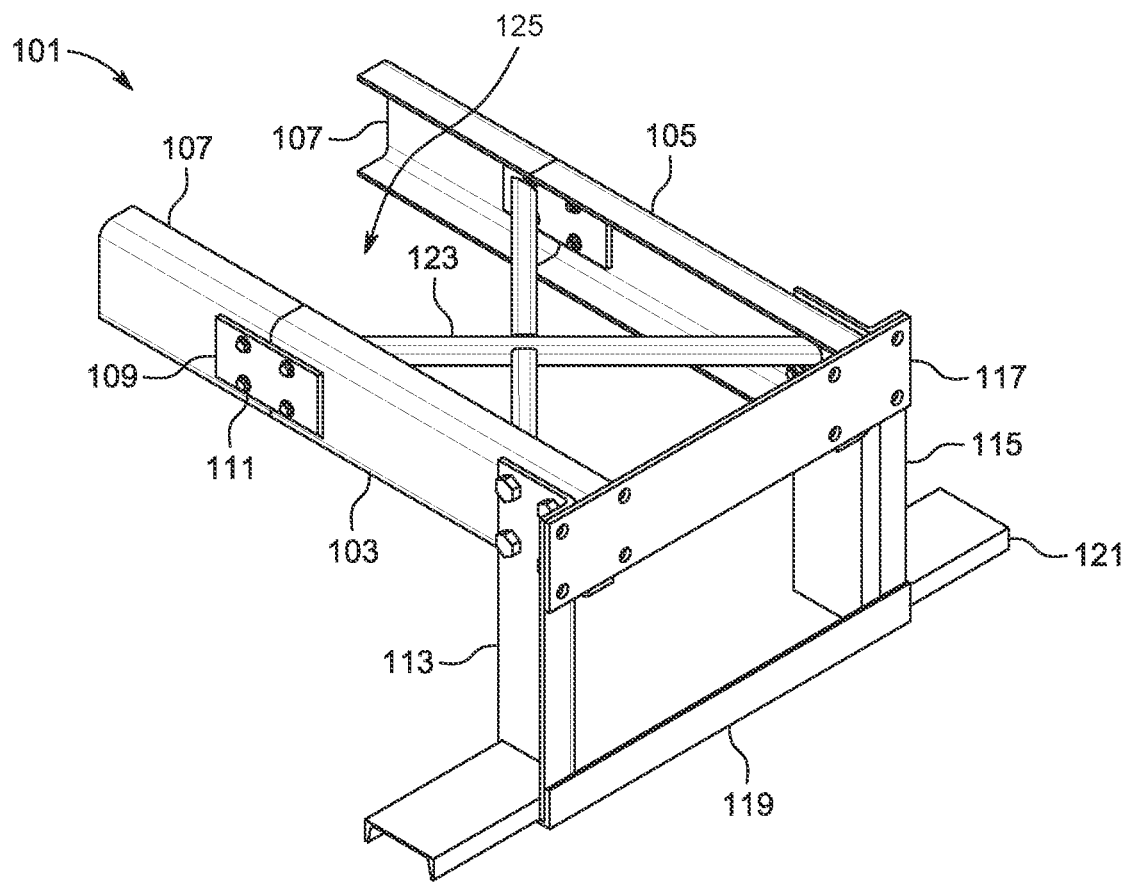
FIG. 1 is a side perspective view of an attenuator mounting system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional safety systems. Specifically, the present invention enables a TMA to attach to fire engines. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a side perspective view of an attenuator mounting system in accordance with a preferred embodiment of the present application. It will be appreciated that system 101 overcomes one or more of the above-listed problems commonly associated with conventional safety systems.

In the contemplated embodiment, system 101 includes a left channel 103 and a right channel 105 that are attached to the vehicle frame 107 such as that of a first responder vehicle like a firetruck. Left channel 103 and right channel 105 attach to vehicle frame 107 via mending plates 109 and fasteners 111. Left channel 103 has a left angle 113 attached thereto via fasteners or the like. Right channel 105 has a right angle 115 attached thereto via fasteners or the like. A TMA mounting plate 117 is attached to left channel 103, right channel 105, left angle 113, and right angle 115 to create a space 125 between the left and right. Space 125 is crossed by a brace 123 that is attached to left channel 103 and right channel 105, a bumper 121 that is attached to left angle 113 and right angle 115. A support 119 is attached to bumper 121, left angle 113, and right angle 115.

Figure 2A:
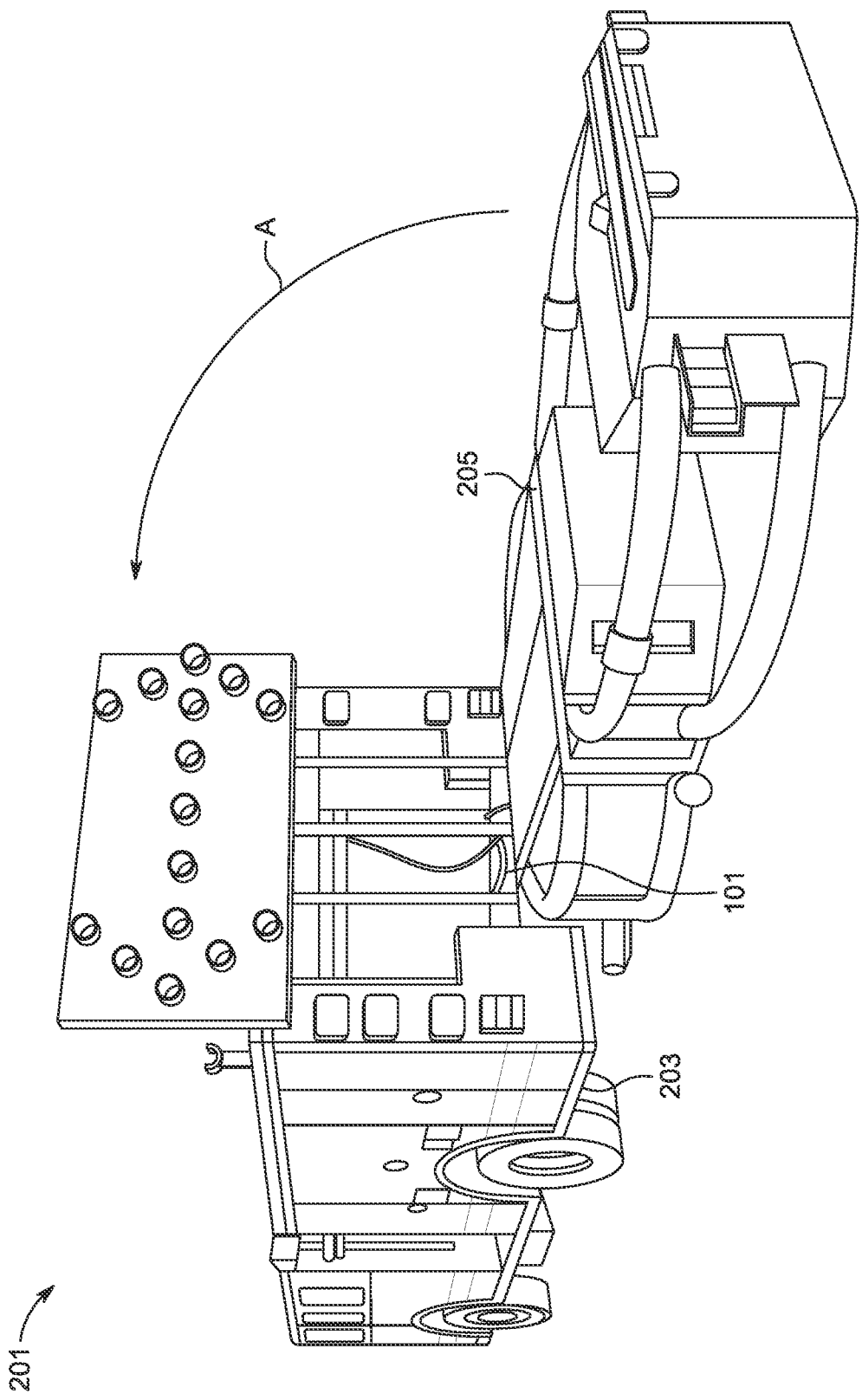
FIGS. 2A and 2B are side perspective views of the system of FIG. 1 in use.
Figure 2B:
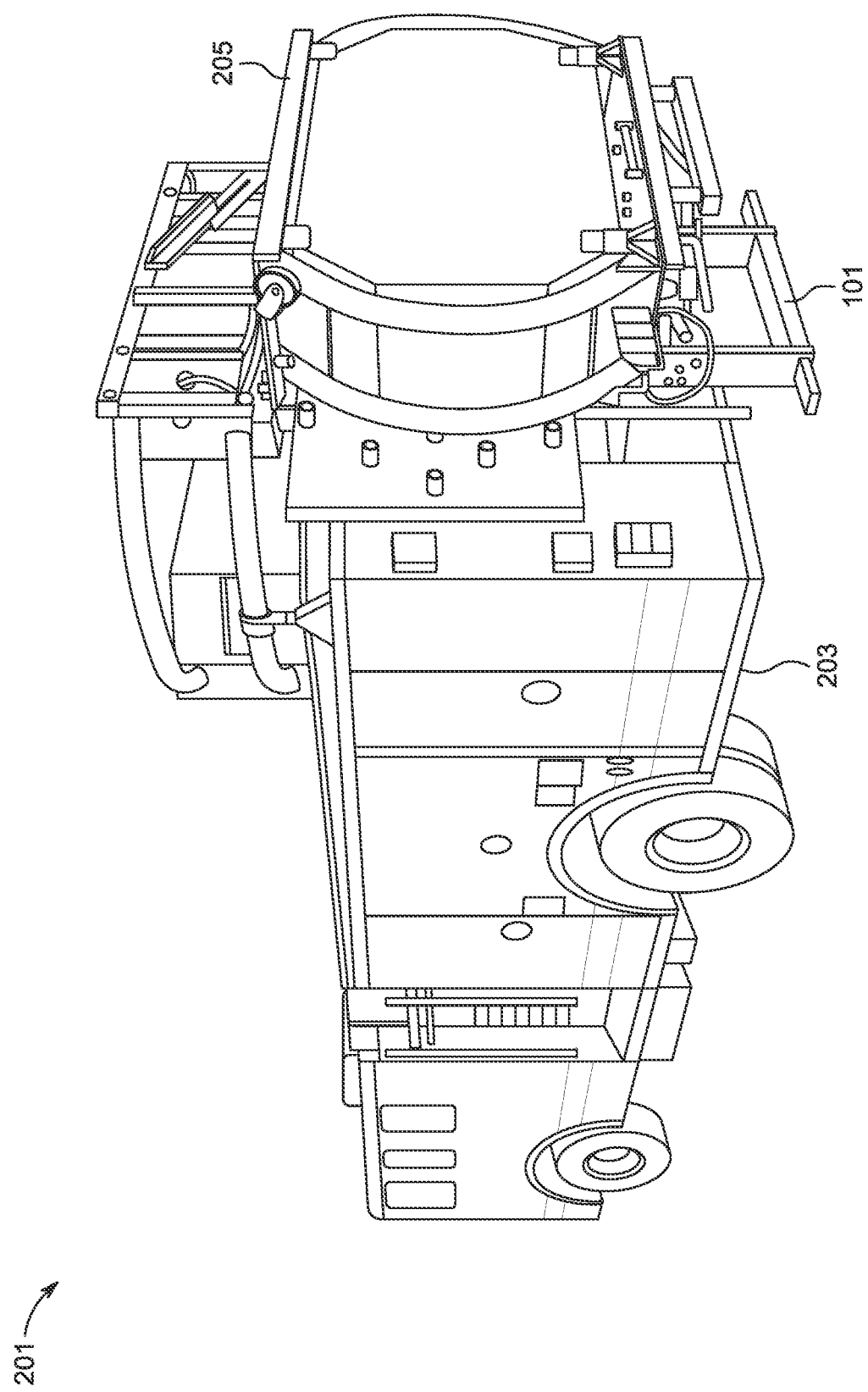

Referring now to FIGS. 2A and 2B, the preferred embodiment 201 is depicted in use, a TMA 205 is attached to TMA mounting plate 117. Attenuator mounting system 101 is attached to a fire truck 203 so that when deployed TMA 205 protects fire truck 203 from impacts from other vehicles. When not in use TMA 205 is retracted as depicted by motion A so that it is readily transportable.

It should be appreciated that one of the unique features believed characteristic of the present application is that left channel 103, right channel 105, and TMA mounting plate 117 allow TMA 205 to be attached to fire truck 203 or the like. The form of firetruck 203 no longer prohibits the attachment of TMA 205 as the channels extend to frame 107 of fire truck 203.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. An attenuator mounting system comprising:
   a first responder vehicle with a frame having:
      a left channel with a left angle attached thereto, the left channel is removably secured to the frame via a first support; and
      a right channel with a right angle attached thereto, the right channel is removably secured to the frame via a second support;
   a truck mounted attenuator;
   a first brace secured to first support and the right angle;
   a second brace secured to the second support and the left angle, the second brace is secured to the first brace;
   a bumper secured to the both the left channel and the right channel via respective left angle and right angle; and;
   a TMA mounting plate secured to the left channel and the right channel, the TMA mounting plate is configured to secure to a TMA that extends from the frame;
   wherein the brace, the bumper and the TMA mounting plate attach to and create a space between the left channel, right channel, left angle, and right angle; and
   wherein in the truck mounted attenuator attaches to the TMA mounting plate.

2. The system of claim 1 wherein the left channel and right channel are attached to the frame of the first responder vehicle via mounting plates and fasteners.

\* \* \* \* \*